G. K. BABCOCK.
Measuring Faucet.
No. 27,679. Patented April 3, 1860.
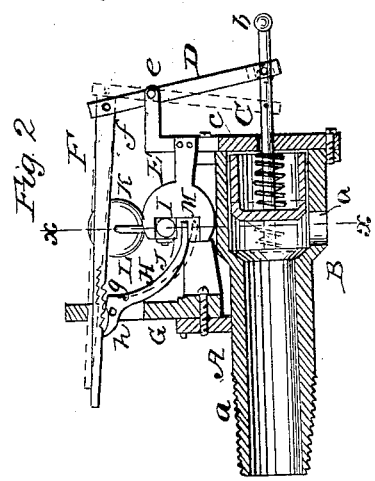
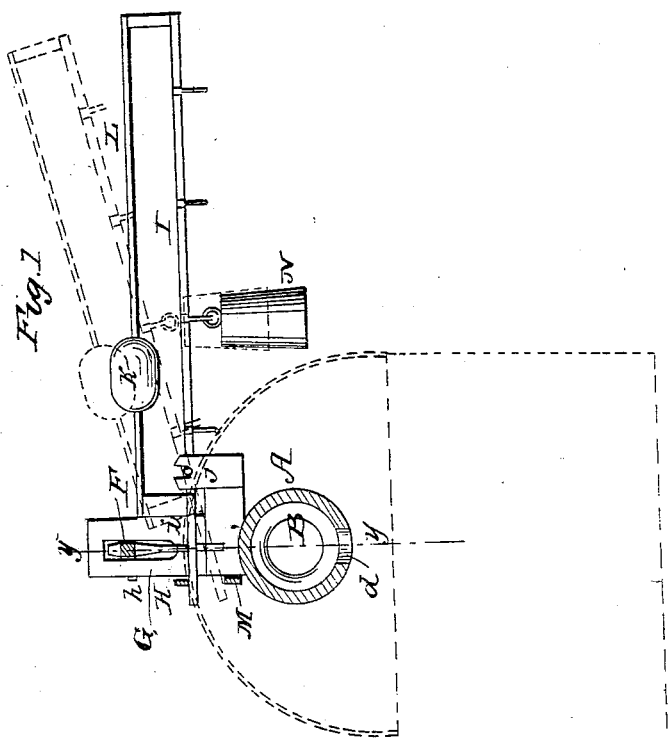
Witnesses
J W Coombs
R. S. Spencer
Inventor
Geo. K. Babcock
per Munn & Co
attys.

UNITED STATES PATENT OFFICE.

GEO. K. BABCOCK, OF UTICA, NEW YORK.

MEASURING-FAUCET.

Specification of Letters Patent No. 27,679, dated April 3, 1860.

*To all whom it may concern:*

Be it known that I, GEORGE K. BABCOCK, of Utica, in the county of Oneida and State of New York, have invented a new and Improved Measure-Faucet; and I do hereby declare that the following is a full, clear, and exact description of the same, reference being had to the annexed drawings, making a part of this specification, in which—

Figure 1, is a vertical section of my invention, taken on the line $x$, $x$, Fig. 2. Fig. 2, a section of ditto, taken in the line $y$, $y$, Fig. 1.

Similar letters of reference indicate corresponding parts in the two figures.

This invention consists in applying a weighing device to a faucet in such a way that the substance to be drawn may be measured by weight and the flow of the substance be automatically cut off by the gravity of the same when the proper or desired quantity has passed into the vessel prepared to receive it.

To enable those skilled in the art to fully understand and construct my invention I will proceed to describe it.

A, represents the tube of the faucet the back part of which may be provided with an external screw thread $a$, as usual. Within the tube A, there is a valve B, to which a rod C, is attached, said rod passing through the front end of the faucet, and having a rod $b$, fitted in its end at right angles. Around the rod C, within the tube A, between its front end and the valve a spiral spring $c$, is placed, and this spring has a tendency to keep the valve B, over the orifice $d$, of the tube and prevent the escape of the liquid therefrom as will be fully understood by referring to Fig. 2.

To the rod C, at the outer side of the tube A, the lower end of a lever D, is attached. This lever D, is secured by a fulcrum pin $e$, to a projecting support E, on the upper part of the tube A. The upper end of lever D, is connected by a pivot $f$, to an arm F, which passes through a slotted upright G, attached to the upper surface of the tube A. The under surface of the back end of the arm F, is provided with ratchet teeth $g$, as shown clearly in Fig. 2, and within the upright G, a pawl or catch H, is fitted, and secured by a pin $h$. The upper end of the pawl or catch H, engages with the teeth $g$, of the arm F, and retains the valve B, at any desired point within the scope of its adjustment so as to allow the orifice $d$, to be more or less open and regulate the escape of the fluid from the faucet. The rod C, and its valve is adjusted as desired, by the operator pulling out the rod C, the requisite distance. This will be fully understood by referring to Fig. 2.

I, is a scale beam the fulcrum of which is in a projecting arm or support J, attached to the lower part of the upright G.

K is a tare counterpoise which is fitted on a rod L, above the scale beam but attached to it.

The scale beam at its inner end is directly over the lower part of the pawl or catch H, which is bent or curved to admit of such a relative position with the end of the scale beam. The inner end of the scale beam works within a guide M, which controls and prevents unnecessary vertical play of the beams on its fulcrum, and on the scale beam near its inner end a small fork $i$, is attached, which fork receives the bail of the pan on which the vessel that receives the substance from the cask is placed.

The operation is as follows: Suppose for instance it is desired to draw a gallon of a substance from within the cask in which the faucet is fitted. The weight of a gallon is ascertained by the scale beam I, and the 'poise weight N, is adjusted on the beam I, at the point which indicates the weight of a gallon, the tare weight K, being adjusted to counterpoise the receptacle suspended on the scale beam. The operator draws outward the rod C, and thereby opens the valve to allow the substance or liquid from the cask to pass into the receptacle suspended on the scale beam, and when a gallon has passed into the receptacle the weight N, will be counterpoised and the inner end of the scale beam descending it will strike the lever end of the pawl or catch H, and its upper end will be thereby thrown out from the teeth $g$ of the arm F, and the spring $c$, will close valve B, and cut off the flow. The orifice $d$, by adjusting valve B, is fully or partially opened according to the character of the substance to be drawn for instance, if a thick substance is to be drawn such as molasses, the orifice is fully opened. If a thin substance is to be drawn such as vinegar, the orifice is but partially opened so as to prevent the too rapid flow of the substance, and the liability to overflow the receptacle before the scale beam can actuate the pawl or catch H.

It will be seen from the above description that the device is self-acting so far as the cut-off movement of the slide is concerned, and that substances can be simultaneously drawn and measured with great accuracy. The device, also is simple and can be manufactured at a reasonable cost and is not liable, as many inventions for the same purpose, to get out of repair.

Having thus described my invention, what I claim as new and desire to secure by Letters Patent, is—

1. Connecting to the slide or valve of a faucet, a scale beam or weighing device, arranged to operate as shown or in any equivalent way, so that the substance to be drawn may be measured by its weight.

2. I further claim the combination of the scale beam I, pawl or catch H, arm F, lever D, and valve rod C, with its valve B, fitted within the tube A, all arranged for joint operation substantially as and for the purpose set forth.

GEORGE K. BABCOCK.

Witnesses:
GEORGE H. CONGAR,
B. F. JOSLYN.